Patented Oct. 19, 1948

2,451,695

UNITED STATES PATENT OFFICE 2,451,695

POLYAMIDES OF HIGH BIREFRINGENCE AND METHOD FOR OBTAINING SAME

Richard S. Schreiber, Wilmington, Del., assignor to E. I. du Pont de Nemours & Company, Wilmington, Del., a corporation of Delaware No Drawing. Application March 6, 1945, Serial No. 581,342

7 Claims. (Cl. 260—78)

This invention relates to polymeric materials, and more particularly to synthetic linear polyamides.

Synthetic linear polyamides are usually obtained from bifunctional polyamide-forming compositions comprising monoaminomonocarboxylic acid or a mixture of diamine and dibasic carboxylic acid, or mixtures of these two types of polyamide-forming compositions. Most linear polyamides, for example polyhexamethylene adipamide or polyhexamethylene sebacamide show a birefringence (defined herein as the numerical difference between two refractive indices observed for a substance), of a low order (0.04–0.07) after orientation by cold drawing or by other methods of producing molecular orientation. While the presence of aromatic nuclei in chains of linear polyamides generally tends to produce a polymer of relatively high birefringence, for example, the polymer formed from a p-bis($\beta$-aminoethyl) benzene exhibits a birefringence of 0.08–0.10, I have found that certain aromatic nuclei-containing diamines more particularly disclosed hereinafter yield polyamides having a birefringence markedly higher than that of the polyamides heretofore obtained.

This invention has as an object the preparation of new and useful polyamides. A further object is the production of polyamides exhibiting an exceptionally high degree of birefringence. A still further object resides in the method for obtaining these polyamides. Other objects will appear hereinafter.

The above objects are accomplished by condensing in equimolecular amounts a dicarboxylic acid having at least four chain carbon atoms between the carboxyl groups, and a 1,2-(p, p'-diaminodiaryl)ethane of the formula

H$_2$N—Ar—CH$_2$.CH$_2$—Ar—NH$_2$ in which Ar in the best embodiment of the invention is a hydrocarbon radical of the group consisting of benzene, naphthalene, and biphenyl. The arylene groups can, however, contain substituents consisting of simple alkyl or alkoxy groups.

Polyamide-forming materials in addition to the dicarboxylic acid and above defined diamine can be included in the reaction mixture which is polymerized to obtain the present polyamides, but this diamine must be present in amount at least 20% by weight of the polyamide-forming composition.

The present polyamides are obtained under the polyamide-forming conditions applicable generally to the manufacture of high molecular weight polyamides. In the best method of obtaining the improved polyamides described herein equimolecular amounts of the dicarboxylic acid and the diamine of the above defined type (or the salt of these two components) is placed in a pressure vessel together with the desired amount of any other linear polyamide-forming ingredients, for example, diamine-dibasic acid salts or amino acids. The mixture is heated to reaction temperature (220–270° C.), the water formed during condensation removed, the heating continued under atmospheric pressure for 1–2 hours at 270° to 290° C., and the reaction mixture is finally heated under vacuum for 2 to 5 hours at 270° to 290° C.

The following examples, in which the parts are by weight, further illustrate the practice of the invention.

Example I

A salt comprising equimolecular quantities of 1,2-(p,p'-diaminodiphenyl)ethane and sebacic acid was placed in a reaction vessel which was blanketed with nitrogen and heated at 298° C. for about 10 minutes. The material was heated at 298° C. for an additional 10 minutes in vacuum, following which temperature was raised to 346–375° C. for a period of over ½ hour. A very high melting polymer having a birefringence of more than 0.17 was obtained.

The more useful polymers, by reason of their lower melting points, are the interpolyamides obtained by including other polyamide-forming reactants with the dicarboxylic acid and diamine of the previously defined formula. Production of polyamides of this kind is illustrated by the following examples.

Example II

In a closed pressure vessel was placed 100 parts of salt from 1,2-(p,p'-diaminodiphenyl)ethane and sebacic acid, and 100 parts of hexamethylenediammonium adipate. The reaction vessel was thoroughly purged with nitrogen and then heated at 225° for 2 hours. The vessel was opened to atmospheric pressure under nitrogen and heated for 0.5 hour at 285° C.; after which the reaction vessel was heated for 2.5 hours at 285° C. under vacuum. The product was a light lemon colored, opaque polyamide, softening at 235–240°, and capable of being spun into long fibers which could be oriented by stretching.

Example III

In a closed pressure vessel was placed 75 parts of salt from 1,2-(p,p'-diaminodiphenyl)ethane-sebacic acid and 25 parts of caprolactam. After purging the system with nitrogen, the reaction mixture was heated at 215° for 1.5 hours, opened to atmospheric pressure under nitrogen and heated at 285° C. for 0.5 hour. The reaction was completed by heating at 285° C. under vacuum for 6.25 hours. Upon cooling, the product was a colorless opaque polymer having an intrinsic viscosity of 0.89 and capable of being spun into long orientable fibers.

Example IV

In a closed reaction vessel was placed 40 parts of salt from 1,2-(p,p'-diaminodiphenyl)ethane-sebacic acid, 20 parts of hexamethylenediammonium sebacate and 40 parts of caprolactam. After purging the vessel with nitrogen, the mixture was heated at 220° C. for 1.5 hours, the pressure reduced to atmospheric pressure under nitrogen and heating continued at 285° C. for 1.0 hour. The reaction was completed by heating at 285° C. under vacuum for 2.0 hours. Upon cooling, the colorless, transparent product softened at 130° C., possessed an intrinsic viscosity of 0.85 and could be spun into long orientable fibers.

Example V

In a closed reaction vessel was placed 60 parts of salt from 1,2-(p,p'-diaminodiphenyl)ethane-sebacic acid and 40 parts of hexamethylenediammonium sebacate. After purging the vessel with nitrogen the mixture was heated at 215° C. for 2 hours, the pressure reduced to atmospheric pressure under nitrogen, and heating was continued at 285° C. for 0.25 hour. Reaction was completed by heating at 285° C. under vacuum for 6.5 hours. Upon cooling the colorless opaque product softened at 260° C., possessed an intrinsic viscosity of 0.92 and could be spun into long orientable fibers.

Example VI

A closed reaction vessel was charged with 50 parts of salt from 1,2-(p,p'-diaminodiphenyl)ethane-sebacic acid, 50 parts of hexamethylenediammonium sebacate, and 287 parts of 1% acetic acid. After purging the vessel with nitrogen the mixture was heated to 285° C. and held at this temperature for 0.5 hour. The pressure was reduced to atmospheric pressure under nitrogen and heating was continued at 290–292° C. for one hour. The reaction was completed by heating under vacuum to 290–292° C. for 3.0 hours. The product obtained softened at 235° C. and had an intrinsic viscosity of 0.8. It was spun into long fibers which could be oriented to give tough resilient yarn. In order to illustrate the property of resilience, fiber-flexor measurements were made. The above interpolymer after drawn 305% of its original length gave a value of 87% as compared with 69% for oriented polyhexamethylene adipamide, and 88–92% for wool fibers.

The high birefringence of the polyamides obtained by the practice of this invention is shown by the following table:

| Polyamide Composition | Birefringence |
|---|---|
| (1) Polyhexamethyleneadipamide | 0.065 |
| (2) Polyhexamethylenesebacamide | 0.04 |
| (3) p,p'-diaminodiphenylmethane-sebacic acid/polyhexamethylenesebacamide (80/20) | 0.035 |
| (4) 1,2-(p,p'-diaminodiphenyl)ethane-sebacic acid/caprolactam (75/25) | 0.16–0.19 |
| (5) 1,2-(p,p'-diaminodiphenyl)ethane-sebacic acid/polyhexamethylenesebacamide/caprolactam (40/20/40) | 0.10 |

The increase in the birefringence brought about by the diaminodiaryl ethane diamines used in the practice of this invention is shown by comparison of the birefringence value of the present polymers in items 4 and 5 and of the table with that of the polyamide in item 3 obtained from the closely related diamino diphenyl methane diamine.

It is preferred to use polyamide-forming compositions yielding polyamides having a birefringence of at least 0.1. It is also preferred to use those diamines of the previously mentioned formula $H_2N-Ar-CH_2.CH_2-Ar-NH_2$ in which the aryl groups are identical. The unsymmetrical compounds, however, can also be used.

As previously indicated the arylene groups can contain as substituents simple alkyl or alkoxy groups, namely, such groups containing not more than 6 carbon atoms, examples of which are:

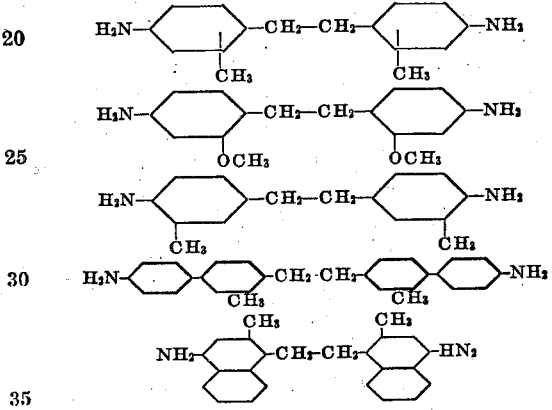

Among the polyamide-forming reactants which can be used in conjunction with the dicarboxylic acid and diamine of the previously defined type are hexamethylene diamine, decamethylene diamine, omega amino acids or their derivatives such as caprolactam.

The new polyamides described herein are of particular value in the manufacture of films in which high birefringence is desired. These polyamides are also useful in making fibers, bristles and molded articles.

As many apparently widely different embodiments of this invention may be made without departing from the spirit and scope thereof, it is to be understood that this invention is not thereby limited to the specific embodiments thereof, except as defined in the appended claims.

I claim:
1. A polyamide consisting of the reaction product of a polyamide-forming composition comprising at least 20% by weight of a mixture in substantially equimolecular amounts of a dicarboxylic acid which has at least 4 chain carbon atoms between the carboxyl groups and in which the carboxyl groups are the sole reactive groups, and a diamine of the formula

$$H_2N-Ar-CH_2.CH_2-Ar-NH_2$$

in which Ar is a 1,4-arylene radical selected from the group consisting of

and

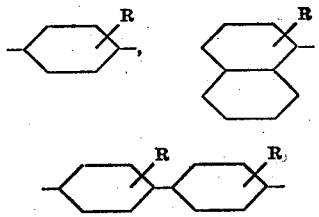

R being a substituent selected from the group consisting of hydrogen, alkyl groups containing not more than six carbon atoms, and alkoxy groups containing not more than six carbon atoms.

2. The polyamide set forth in claim 1 in which R is hydrogen.

3. The polyamide set forth in claim 1 in which both arylene radicals in said formula are benzene radicals.

4. The polyamide set forth in claim 1 in which both arylene radicals in said formula are naphthalene radicals.

5. The polyamide set forth in claim 1 in which both arylene radicals in said formula are biphenyl radicals.

6. An oriented polyamide article which exhibits a birefringence of at least 0.10 and which is the reaction product of the polyamide-forming composition defined in claim 1.

7. A process for obtaining polyamides which after orientation exhibit a birefringence of at least 0.1, said process comprising polymerizing by heating under polyamide-forming conditions reacting material consisting of a polyamide-forming composition which comprises at least 20% by weight of a mixture in substantially equimolecular amounts of a dicarboxylic acid which has at least 4 chain carbon atoms between the carboxyl groups and in which the carboxyl groups are the sole reactive groups, and a diamine of the formula $H_2N-Ar-CH_2.CH_2-Ar-NH_2$ in which Ar is a 1,4-arylene radical selected from the group consisting of

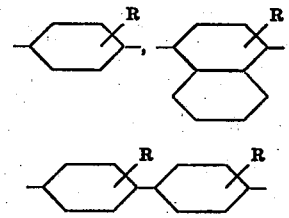

and

R being a substituent selected from the group consisting of hydrogen, alkyl groups containing not more than six carbon atoms, and alkoxy groups containing not more than six carbon atoms.

RICHARD S. SCHREIBER.

REFERENCES CITED

The following references are of record in the file of this patent:

UNITED STATES PATENTS

| Number | Name | Date |
|---|---|---|
| 2,244,192 | Flory | June 3, 1941 |
| 2,389,628 | Martin | Nov. 27, 1945 |